Aug. 16, 1960 L. E. FOGARTY 2,949,233

COMPUTER FUNCTION GENERATOR

Filed Oct. 19, 1956

LAURENCE E. FOGARTY
INVENTOR

BY Darby & Darby
ATTORNEYS 2,949,233
Patented Aug. 16, 1960

2,949,233

COMPUTER FUNCTION GENERATOR

Laurence E. Fogarty, Binghamton, N.Y., assignor to General Precision Inc., a corporation of Delaware Filed Oct. 19, 1956, Ser. No. 616,995

10 Claims. (Cl. 235—186)

This invention relates to the noise-free generation of electrical potentials as non-linear functions of variables. In the design and operation of direct current analog computers, automatic control and instrumentation apparatus, it is frequently necessary or desirable to generate electrical potentials which may vary as particular non-linear functions of variables. For accurate and stable operation of a computer utilizing such functions, it is usually quite desirable that generated functions be free from "noise" or errors such as those caused by finite potentiometer resolution, servo backlash, static friction, hysteresis and like effects, which are commonly incident to electromechanical function generation.

Since the operations of many physical phenomena are analyzed and synthesized with relation to Cartesian cylindrical and polar coordinate systems, it is often necessary to generate electrical potentials as sine and cosine functions of variables. Apparatus of the type designated often makes preliminary computations which result in computer quantities commensurate with the rate of change of particular variables, potentials proportional to such variables, and potentials commensurate with the time integral of such variables. While it is well known in the art that electronic integrating devices, such as the well-known Miller integrator, for example, are more accurate and noise-free than electromechanical integrators, such as velocity servos, much contemporary computer apparatus still utilizes resistance resolvers mechanically operated by the shaft of velocity servo-integrators to provide sine and cosine computing potentials. When such potentiometer-derived non-linear function potentials are applied to further apparatus, the operation of which wholly or partly determines the input data to such a velocity servo, the electro mechanical "noise" provided by the resolver resolution and servo backlash, static friction and hysteresis very often generates "hunting," instability and numerous other adverse dynamic characteristics. The invention provides means by which such non-linear functions of variables may be represented as electrical potentials free of the above mentioned "noise."

It is therefore a primary object of the present invention to provide improved means for providing an output potential commensurate with a desired non-linear function of an independent variable from an input potential commensurate with time rate of change of said variable.

It is a more specific object of the invention to provide means of the abovedescribed type which supplies output signals which are substantially free from the "noise" usually incident to electromechanical function generation.

It is a further object of the invention to provide means of the type described which is free from inaccuracy due to integrator drift.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing in which.

Figure 1:
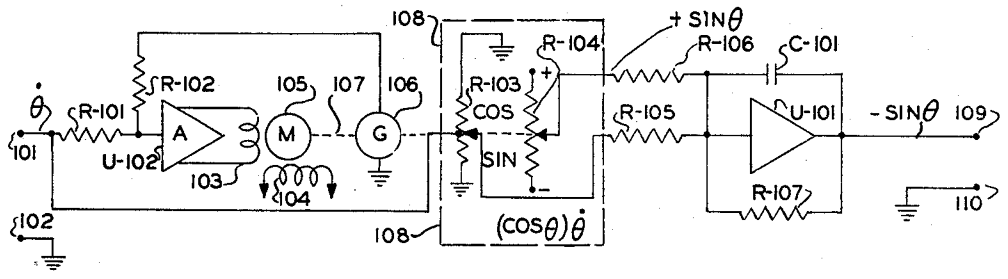
Fig. 1 is an electrical schematic diagram of an illustrative embodiment of the invention connected to provide output potentials commensurate with the sine function.

Referring to Fig. 1 there is shown an illustrative embodiment of the invention for providing a substantially noise-free potential commensurate with sin $\theta$ from an input potential commensurate with $\dot{\theta}$, where the dot indicates differentiation with respect to time. The $\dot{\theta}$ potential is applied at terminal 101 to excite the cosine winding R–103 of a conventional resistance resolver shown within dashed lines at 108. The $\dot{\theta}$ input potential is also applied via resistor R–101 to a servo-amplifier, which amplifies its resultant input or "error" potential and drives the control winding 103 of a conventional two-phase servo-motor. Quadrature winding 104 of the servo-motor is excited by reference alternating current potentials from a conventional alternating current supply, and servo-motor rotor 105 thereby rotates shaft 107 with a torque substantially commensurate with the servo amplifier output quantity. The servo amplifier may be conventional, and for example, may comprise either an electronic or magnetic servo amplifier. Inasmuch as the $\dot{\theta}$ input potential at terminal 101 is a direct current signal and an alternating current servo-motor is shown, the servo amplifier should include means for modulating the direct current signal at the same frequency as the reference voltage applied to quadrature winding 104. The rotor 105 of the servo-motor rotates a direct current tachometer generator 106, and through reduction gearing (not shown) rotates the arms of resolver 108, and further loads (not shown). The output potential commensurate with the angular velocity of the servo output shaft generated by tachometer generator 106 is applied by way of scaling resistor R–102 to be summed with the $\dot{\theta}$ potential at the input circuit of the servo amplifier.

The usual method employed by the prior art to provide a sine $\theta$ potential from a $\dot{\theta}$ input potential has been merely to utilize the output from a sine winding of a resistance resolver mechanically driven by a velocity servo. The values of the sin $\theta$ potential derived in such a manner have been inaccurate due to the time lags of the velocity servo, and have been "noisy" due to the granularity of poor resolution of the resistance resolver winding. In the invention, the sin $\theta$ output is taken from the output terminals of an electronic integrator, so that the invention provides a substantially noise-free potential. As mentioned above, the $\dot{\theta}$ input potential is applied to excite the cosine winding R–103 of resistance resolver 108. The arm of the cosine winding is positioned by the velocity servo output shaft, thereby deriving a $\dot{\theta}$ (cos $\theta$) potential which is applied via summing resistor R–105 to the input circuit of a conventional electronic integrator shown as comprising an operational amplifier U–101 having a feedback capacitor C–101 connected between its output and input terminals.

By elementary calculus it is well known that:

$$\frac{df(x)}{dt}=f'(x)\frac{dx}{dt} \qquad (1)$$

Differentiating sine and cosine functions of a variable $\theta$ which varies with respect to time, one obtains the following:

$$\frac{d \sin \theta}{dt} = \cos \theta \frac{d\theta}{dt} \quad (2)$$

$$\frac{d \cos \theta}{dt} = -\sin \theta \frac{d\theta}{dt} \quad (3)$$

As shown above in Expression 2, the input potential applied via resistor R–105 is the time derivative of the quantity sin $\theta$, so that integration of this input potential with respect to time provides an output potential at terminal 109 commensurate with — sin $\theta$. Inasmuch as this potential is taken directly from the output circuit of an electronic integrator, it is free of noise caused by any resolution limitations of cosine resolver R–103.

Although the output potential derived at terminal 109 is thereby made noise-free, any drift of the integrator would cause an error in the computed value of the sin $\theta$ output potential. For this reason, I have provided a drift correction circuit which insures that the steady-state value of sin $\theta$ will remain accurate even if the integrator drifts. Sine winding R–104 of resolver 108 is excited at its opposite terminals by supply voltages of opposite polarity, and since the arm is positioned with respect to the winding by the velocity servo shaft, a potential commensurate with sin $\theta$ will be applied via summing resistor R–106 to the input circuit of the electronic integrator. Obviously, integration of the quantity sin $\theta$ with respect to time would add an erroneous component to the integrator output voltage, so an opposing sin $\theta$ potential is applied from the output of the integrator through scaling resistor R–107 to the input terminal of the integrator.

Assume that the velocity servo is positioned at a steady value of the angle $\theta$, so that a steady voltage output should appear at terminal 109, but that integrator drift (due to capacitor leakage, for example) causes the output voltage at terminal 109 to drift slowly. The change in current applied to the integrator input circuit via resistor R–107 will cause such current not to cancel exactly with the opposite polarity sin $\theta$ input potential applied through resistor R–106, thereby providing an error signal which is amplified by amplifier U–101, forcing the output potential at terminal 109 to agree with the sin $\theta$ potential appearing on the arm of sine winding R–104. Thus it may be seen that the desired function output potential from the electronic integrator is compared with an electromechanically generated signal and the difference applied to correct the integrator. By this means, the steady-state value of the integrator output is maintained at the average magnitude of the electromechanically generated sin $\theta$ signal. Selection of scaling resistors R–106 and R–107 with respect to R–105 determine the effect which the drift correction circuit has on integrator output. The less the resistance of these resistors compared to resistor R–105, the greater the effect the drift correction voltage will have on the integrator output signal. Inasmuch as drift of most electronic integrators is small, extremely small drift correction currents are usually adequate.

Figure 2:
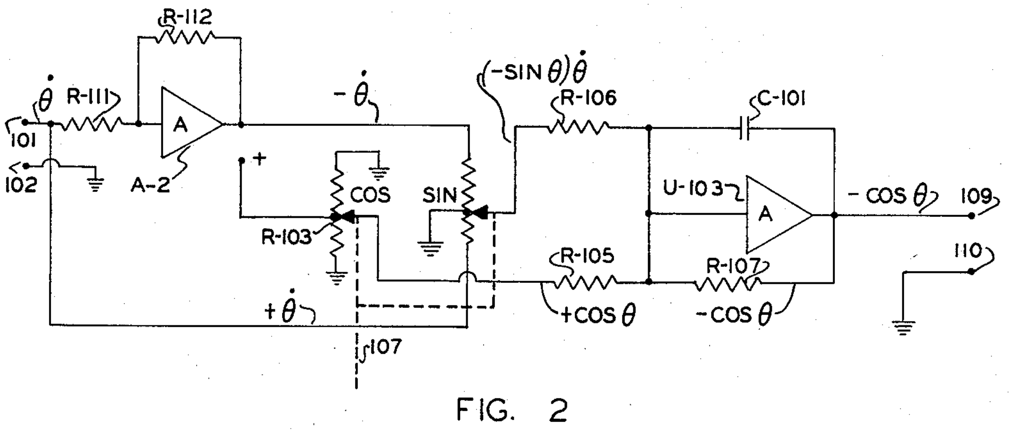
Fig. 2 is an electrical schematic diagram showing how a portion of the apparatus of the invention may be connected to provide cosine function output potentials.

Shown in Figure 2 is a portion of alternative embodiment of the invention in which like numerals are given to like parts. While the embodiment of Fig. 1 provides sine function output potentials, Fig. 2 shows connections which may be used to provide output potentials commensurate with cosine functions of an independent variable. It will be noted that in Fig. 2 the product-term potential integrated by the electronic integrator is derived from the sine winding of the resolver rather than from the cosine winding, and that the drift correction term is derived by the cosine winding R–103 of the resolver rather than the sine winding. Also, inasmuch as differentiation of the cosine gives rise to a sign change, a polarity inversion amplifier A–2 is provided to invert the input signal from terminal 101. Shaft 107 may be positioned by a servo (not shown) of the same type as disclosed with relation to Figure 1. In view of the detailed explanation given above with respect to Fig. 1, the operation of the apparatus of Fig. 2 in solving Expression 3 will become obvious.

Those skilled in the art may recognize that the electronic integrators shown together with resistor R–107 connected as a feedback resistor may be described as lag or delay networks, an integrator alone having a transfer function of $$\frac{1}{p}$$

and a parallel combination of integrator and feedback resistor having a transfer function $$\frac{1}{p+k}$$

Thus it may be seen that the invention utilizes a delay network which receives two input potentials. The first of these is a potential commensurate with the product of the input signal and the derivatives of the desired function of the independent variable, and the second of these potentials is a drift correction potential derived in substantially the same manner as prior art desired output function potentials are electromechanically derived. Those skilled in the art should be readily aware that various other lag circuits having the same transfer function are available, and it is within the scope of this invention to substitute such other circuits.

Figure 3:
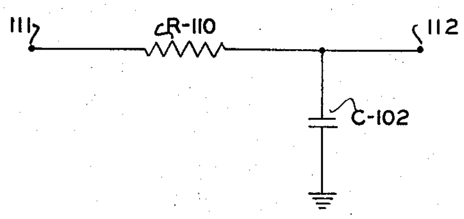
Fig. 3 is a schematic diagram of an exemplary lag network which may be substituted into certain embodiments of the invention.

An example of another type of lag circuit is the simple L-type filter circuit shown in Fig. 3. If the output potential is not to be applied to a low impedance load, a simple lag network such as shown in Figure 3 may be utilized, and it may be connected to the load through a buffer, if desired. It may be mentioned that the transfer function of the lag network of Fig. 3 approximates that of the integrator-resistance circuit of Fig. 1 only when the capacitor is not charged up more than 5 or 10 percent. Hence it usually is desirable to utilize an operational amplifier, so that inordinately large capacitors need not be provided for the desired accuracy and range of operation.

While the invention has been illustrated by apparatus for generating sine and cosine functions, it is just as applicable to many other non-linear functions, including arbitrary and empirical functions as well as trigonometric functions. It may be applied to any function the derivative of which may be provided in a potentiometer characteristic. The derivative potentiometer (R–103 in Fig. 1, R–104 in Fig. 2) may be "shaped" by a variety of well-known techniques, and the characteristic of the potentiometer may be varied where different output functions are desired in accordance with standard techniques such as taps or diode generation. Buffer amplifiers commonly utilized to avoid potentiometer loading have been omitted from this disclosure for clarity. All of the separate elements of apparatus utilized herein are standard or may be constructed using standard techniques.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for providing an output potential commensurate with a desired non-linear function of an independent variable comprising in combination, an input potential commensurate with time rate of change of said variable, electromechanical integrating means responsive to said input potential and operative to provide a mechanical output quantity commensurate with said variable, a potentiometer excited by said input potential and adjusted by said mechanical output quantity to provide a second potential, said potentiometer having a characteristic corresponding to the derivative of said desired non-linear function with respect to said variable, and an electronic integrator responsive to said second quantity to provide said output potential.

2. Apparatus for providing an output potential commensurate with a desired non-linear function of an independent variable from an input potential commensurate with time rate of change of said variable comprising in combination an integrating servo responsive to said input potential, a potentiometer having a winding excited in accordance with said input potential and an arm adjusted along said winding by said servo, said winding having a characteristic according to the derivative of said desired non-linear function with respect to said variable, an electronic integrator, and circuit means connecting said arm of said potentiometer to said integrator.

3. Apparatus for providing an output potential commensurate with a desired non-linear function of an independent variable from an input potential commensurate with the time rate of change of said variable, comprising in combination, a servo function generator responsive to said input potential for providing a further potential commensurate with the product of said input potential and the derivative of said desired function with respect to said variable, and an electronic integrator responsive to said further potential for providing said output potential, said servo function generator comprising an integrating servo operative to position a potentiometer excited by said input potential.

4. Apparatus according to claim 3 in which said desired non-linear function is a sine function and said potentiometer has a cosine function characteristic.

5. Apparatus according to claim 3 in which said desired non-linear function is a cosine function and said potentiometer has a sine function characteristic.

6. Apparatus according to claim 3 having a second potentiometer operated by said servo, said second potentiometer having a characteristic corresponding to said desired function to provide a third potential, and means for comparing said third potential with the output potential from said integrator and applying the difference between the compared potentials to said electronic integrator.

7. Apparatus according to claim 3 having further means for providing a second potential commensurate with said output potential, means for applying said second potential to said electronic integrator, and means for applying a portion of the output signal of said electronic integrator to the input circuit of said electronic integrator.

8. Apparatus for providing an output potential commensurate with a desired non-linear function of an independent variable from an input potential commensurate with the time rate of change of said variable comprising in combination, a servo function generator responsive to said input potential for providing a second potential commensurate with the product of said input potential and the derivative of said desired function with respect to said variable and a third potential commensurate with said desired non-linear function of said variable, and a delay circuit responsive to said second and third potentials, said servo function generator comprising an integrating servomechanism operative to position a potentiometer excited by said input potential.

9. Apparatus according to claim 8 in which said delay circuit comprises a direct-coupled high loop-gain operational amplifier having an odd number of stages, and a feedback capacitor and a feedback resistor connected in parallel with each other between the input and output circuits of said amplifier.

10. Apparatus according to claim 3 in which said integrating servo comprises an amplifier operative to receive said input potential and a rate feedback potential and to provide an amplified error signal, a motor connected to be driven by said amplified error signal, and a tachometer generator mechanically driven by said motor and operative to provide said rate feedback potential.

References Cited in the file of this patent

UNITED STATES PATENTS

| | | |
|---|---|---|
| 2,657,296 | Brown | Oct. 27, 1953 |
| 2,752,491 | Ringoen | June 26, 1956 |
| 2,771,243 | Wolin et al. | Nov. 20, 1956 |

OTHER REFERENCES

Electronics (Korn), April, 1948, page 125.